Dec. 20, 1938.     J. SCHULTE     2,141,047
GAS AND LIQUOR TREATMENT APPARATUS
Filed April 6, 1936
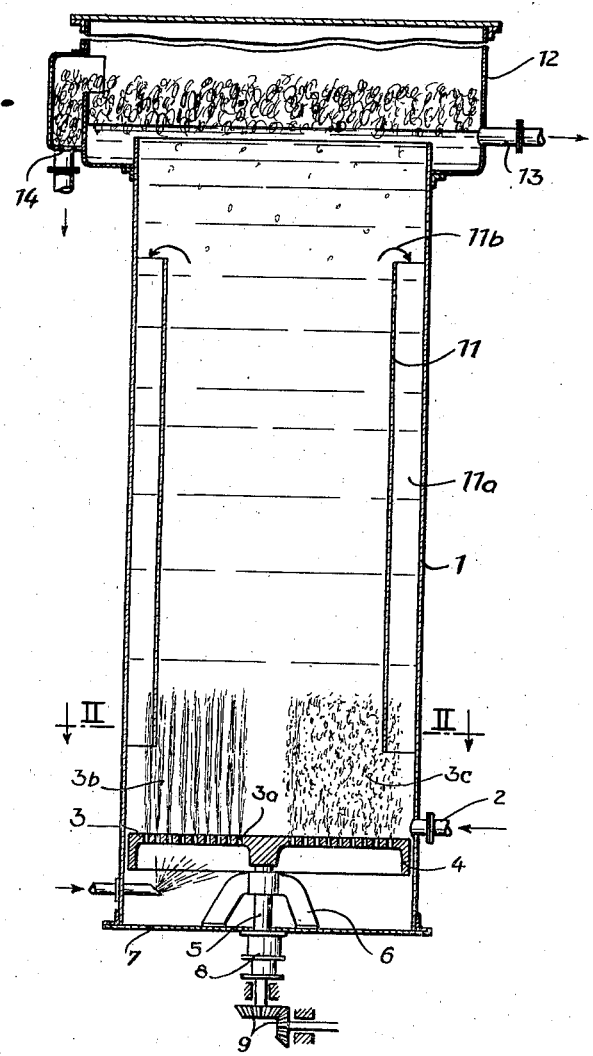
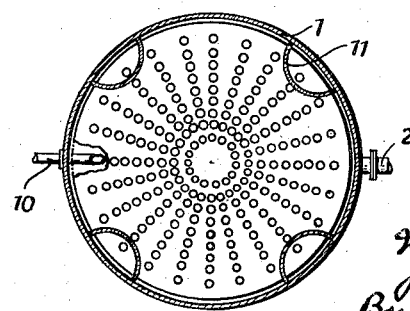
Inventor:
Johannes Schulte
By Henry Love Clarke
his Attorney Patented Dec. 20, 1938

2,141,047

UNITED STATES PATENT OFFICE 2,141,047

GAS AND LIQUOR TREATMENT APPARATUS

Johannes Schulte, Essen, Germany, assignor, by mesne assignments, to Koppers Company, Pittsburgh, Pa., a corporation of Delaware Application April 6, 1936, Serial No. 73,046
In Germany April 6, 1935

2 Claims. (Cl. 261—93)

The invention relates to the treatment of liquors with finely divided gases and more particularly to the activation of spent washing liquors which are produced during the removal of hydrogen sulphide and other impurities from gases, such as coal distilling gases or the like, if the gas to be cleaned is brought into contact with a liquor containing compounds, absorbing sulphur, whereby the sulphur especially in elementary form is separated by treating the liquor with air or other oxidizing gases and the materials for absorbing the sulphides are reformed.

The present invention comprises in particular the activation of the spent washing liquors of the so-called Thylox gas purification process in which the gas to be cleaned is brought into contact with an alkaline solution of sulphur oxygen compounds of a metal, belonging to the tin-group of the qualitative analysis, for instance with compounds containing arsenic, sulphur and oxygen. In this process, the spent washing liquor is usually treated with air in a tower, which is called a thionizer. The air is introduced at the bottom of the thionizer. By means of the oxygen, the elementary sulphur is separated from the sulphur-arsenic-oxygen compounds and the lower sulphurized arsenic oxygen compounds, effective for the absorption of hydrogen sulphide, are reformed. The separated sulphur collects as a slurry on the surface of the washing liquor in the thionizer and is separately recovered from the washing liquor.

The contrivances used hitherto for the activation fulfill in principle their aim, i. e., it is possible to obtain with them the necessary oxidation for the washing liquor. For the purpose of obtaining the desired degree of oxidation, it is, however, necessary to make use of a comparatively large amount of compressed air, and furthermore, the height of the thionizer and thus the pressure of the oxidizing air which is introduced at the bottom of the thionizer has to be unfavorably high. Increased initial costs and operating expenditures which latter are caused by the production of highly compressed air, result from same.

The main object of my present invention is to improve the arrangements for introducing air into the washing liquor at the bottom of the thionizer in such a way, that the oxidizing air is utilized to a much greater extent for the chemical reactions, so that there is a possibility of reducing the quantity of the oxidizing air which is necessary for obtaining a certain degree of oxidation, as well as also the height of the thionizer if necessary, and thus reduce the pressure to which the air must be raised for the oxidizing medium.

Another object of my invention consists in that the thionizer is designed in such a way, that the ascenional force of the oxidizing air is utilized for producing a circulating movement in the liquor within the thionizer, by which is effected a more intensive mixing of the oxidizing air with the washing liquor, without being necessary to provide additional power devices, such as pumps for circulating the liquor.

A characteristic feature of my present invention consists in that a perforated plate above the gas inlet is arranged at the bottom of the thionizer, rotating around a vertical axis in such a way, that the oxidizing gases are distributed through the holes of the rotating plate into the washing liquor. Preferably I construct the rotating distributing plate in the form of a bell having below an open cavity for inlet of air which prevents the gases from escaping around the periphery of the plate into the washing liquor rather than through the perforations of the plate.

Another important feature of my invention is to provide in the thionizer return channels, leading from the top of the liquor column down to the bottom of the thionizer in such a way, that a flow-back of the washing liquor from the top of the thionizer to its lower part is rendered possible.

Still further objects of my present invention may be taken from the following description of a preferred embodiment of my invention illustrated in the accompanying drawing, in which—

Fig. 1 shows a vertical section through a thionizer constructed according to my invention and Fig. 2 is a horizontal section on the line of II—II of Fig. 1.

The thionizer illustrated on the drawing essentially consists of a vertical cylindrical vessel 1, into which is introduced the liquor to be treated from the bottom through the pipeline 2. The pipeline 2 is, for instance, connected with the liquor by-pass of the gas-purification plant, not shown on the drawing.

A perforated plate 3 is provided for underneath the liquor inlet 2 in the thionizer; the edge 4 of the plate 3 is drawn downwards, so that the plate 3 has substantially the shape of a bell. The plate 3 is supported on a shaft 5, which is carried in a bearing block 6 at the bottom 7 of the thionizer in a rotating way. The shaft 5 passes through the bottom 7 of the thionizer. The passage for the shaft is sealed by means of a stuffing box 8. The shaft 5 is, for instance, rotated by a bevel-wheel drive 9, which is connected to a motor or another suitable power shaft, not shown on the drawing.

The pipe 10, through which the gas to be brought into contact with the liquor, for instance, compressed air, is led into the interior of the thionizer 1, runs underneath the plate 3 into the thionizer. As may be seen from the drawing, the gas pipe 10 inside the thionizer reaches underneath the cavity of the bell-shaped plate 3. Consequently, the air introduced through the pipe 10 into the thionizer underneath the bell-shaped plate goes into the tower, whereby the edge 4 of the plate prevents the oxidizing gas from passing through the slot between the plate and the wall of the thionizer. The gas, however, enters through the holes 3a of the plate in multiple fine jets into the liquor column lying above.

When operating the apparatus, the plate is rotated in such a way, that it makes for instance, 200 revolutions per minute. The necessary revolution index of the plate corresponds in any individual case to the desired degree of dividing-up the gas in the liquor and to the physical properties of the liquor. In order to keep the resistance of the plate, when rotating in the liquor as low as possible, the plate is preferably made exactly level and is arranged in a plane preferably to the shaft 5. If the plate is accurately made, the energy necessary for its rotation is comparatively low. The holes of the perforated plate are of a comparatively small diameter, for instance, they may have preferably a diameter of about 4–5 millimeters.

While the plate is at a standstill, the treating gas comes from the plate holes 3a in thin jets, as marked at 3b in Fig. 1 of the drawing, whereas there is effected by the rotation of the plate a dividing-up of the air into various small bubbles, as illustrated on the drawing and marked with 3c. On account of the fine dividing-up of the gas into small bubbles, the contact surface which is of importance for the effect of oxidation is considerably enlarged between the gas and the liquor. From this results a considerably quicker oxidation or a more effective treatment of the liquor or of the gases corresponding to the reactions which are carried out in the tower. From the fine dividing-up of the gases it further follows that the ascension velocity of the gases in the thionizer is decreased, and thus the time of contact between gas and liquor is increased. Finally, there is obtained another advantage from the very extensive and uniform dividing-up of the gases in the liquor when carried out in the contrivance according to my invention in that the small air bubbles are prevented from forming into large bubbles.

This undesired formation of the large gas bubbles is, moreover, further decreased, according to my invention, by means provided in the thionizer to enable a flow-back of the liquor from the top down to the bottom of the thionizer, corresponding to the ascensional movement of the liquor caused by the treating gases.

For this purpose, there are fastened, for instance, tubular-like sheet bodies 11 inside the thionizer 1. These bodies are open above and below and they form channels 11a into which the liquor enters from above, as marked by the arrow 11b and again flows out at the bottom. Instead of providing the thionizer 1 with the tubular-like bodies 11, it is also possible to equip the thionizer with an inside shell being open at the top and at the bottom, or there is another possibility of suspending into the thionizer from above such pipes which are open at both ends, which is especially suitable if the flow-back arrangement shall be fitted afterwards to the existing thionizers.

The return channels 11a are, moreover, of special advantage if the thionizer is to be used for regenerating a liquor, which has been produced during a process for the removal of sulphur compounds from gases and from which elementary sulphur is to be separated by a treatment with air.

It has often been found that the separation of sulphur is considerably better if a larger quantity of finely distributed sulphur is present in the liquor. By a partial leading back of the liquor highly enriched with sulphur from the top of the thionizer into the lower part of the tower, the concentration of the elementary sulphur in the treating liquor is increased at the bottom of the thionizer, i. e. in that zone in which the fresh treating gases have first come into contact with the liquor.

An overflow tank 12 has been provided for at the top of the thionizer, in which a slurry separated from the solution, for instance, sulphur slurry, separates from the liquor. The liquor treated finally flows off through the pipeline 13, whereas the sulphur slurry can be discharged through the pipeline 14.

I have described the carrying out of my invention principally in connection with its use for an actifying tower for a process for removing the sulphur compounds from gases. My invention is however also useful for other gas treatment processes, i. e., almost for every case in which gases finely distributed are to be brought into contact with liquors.

Finally, I should like to mention in particular that the arrangement of the return channels, as described above, can be advantageously used for the flow-back of the liquor from above downwards also in other types of towers or thionizers or the like, which do not have a special contrivance, which includes a rotating perforated plate for distributing the air.

I have above described my present invention on the lines of a preferred embodiment thereof; but my invention is not limited in all its aspects to the mode of carrying out as described and shown, since invention may be variously embodied within the scope of the following claims.

I claim:

1. Apparatus for the treatment of liquors with gases, especially for the treatment of spent gas washing liquors with oxidizing gases, comprising a tower-like vessel of relatively much greater height than width having a foam outlet and its liquor outlet at its upper portion and having its liquor inlet and its gas inlet near its bottom for unidirectional upward flow of gas and liquid, means for diffusing gas into liquid in the vessel comprising a perforated rotatable horizontal plate arranged inside the vessel above the gas inlet but below the lower liquid inlet, and means for rotating the plate when the vessel is filled with liquor, the perforated plate being mounted for rotation on a vertical axis and having the perforations in the horizontal plane of the plate, and the liquid inlet means for the vessel being confined to deliver the liquid solely above the means for diffusing gas into the liquid in the vessel, and the vessel being constituted to provide an unobstructed liquid flow space, for quiescent upflow of gas and liquid free from agitation and diffusing means, for a height above the gas diffusing means many times the height of the portion of the vessel given over to the diffusion of gas therein.

2. Apparatus for the treatment of liquors with gases, especially for the treatment of spent gas washing liquors with oxidizing gases, comprising a tower-like vessel of relatively much greater height than width and having a foam outlet and its liquor outlet at its upper portion and having its liquor inlet and its gas inlet near its bottom for unidirectional upward flow of gas and liquid, downflow channel-means arranged in the tower to connect the upper part of the tower with the lower part in such manner that the channel area is by-passed by the main flow of ascending gases from the gas inlet but communicates with the liquid at the upper and lower part of the tower so that the liquor may be caused to flow downwards through the channel area from the top zone to the bottom zone due to acceleration of upflow of liquor outside the channel-means at the lower part thereof by the ascensional force of the ascending gases outside the down-flow channel means, and in which the downflow channels are arranged in spaced relationship in an annular series around the inside of the vessel alongside the inner surface of the surrounding wall therefor so as to leave a central vertical upflow space within such annular series, and in which a perforated rotary horizontal plate is mounted for rotation about a vertical axis with the horizontal plate rotatable in a horizontal plane co-extensive with the central vertical flow space at a level near the lower ends of the downflow channels but above the gas inlet means, and with the perforations in the horizontal plane of the rotary plate, and in which the central vertical upflow space formed within the annular series of downflow channels is unobstructed against vertical flow from the region of the horizontal rotary plate to the upper ends of the downflow channels.

JOHANNES SCHULTE.